Patented Mar. 22, 1938

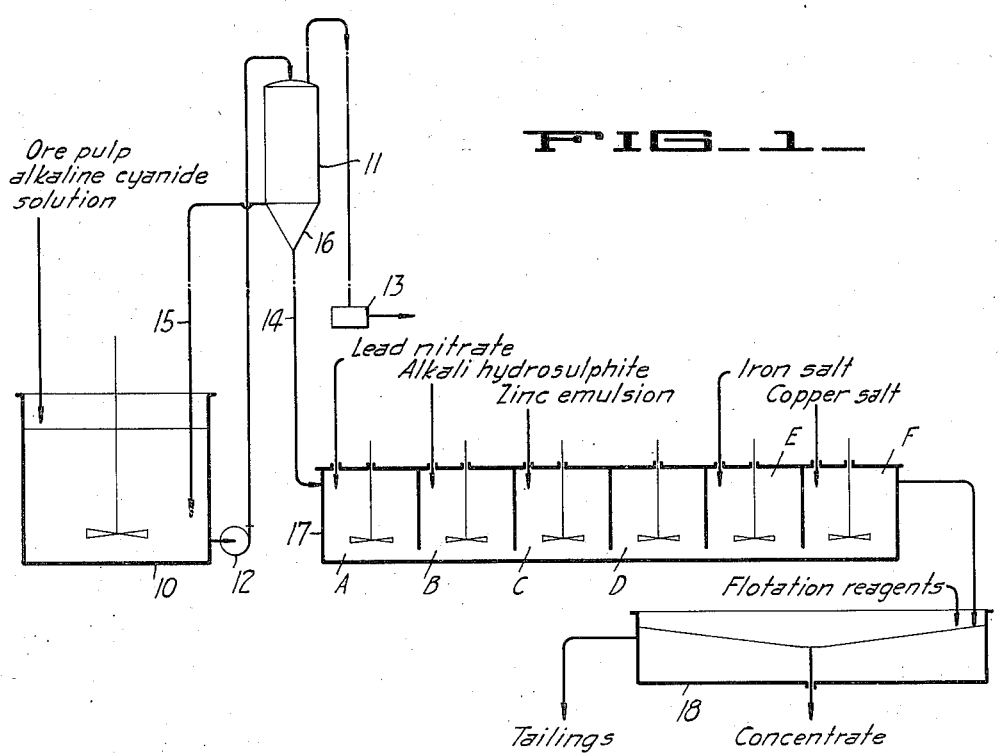
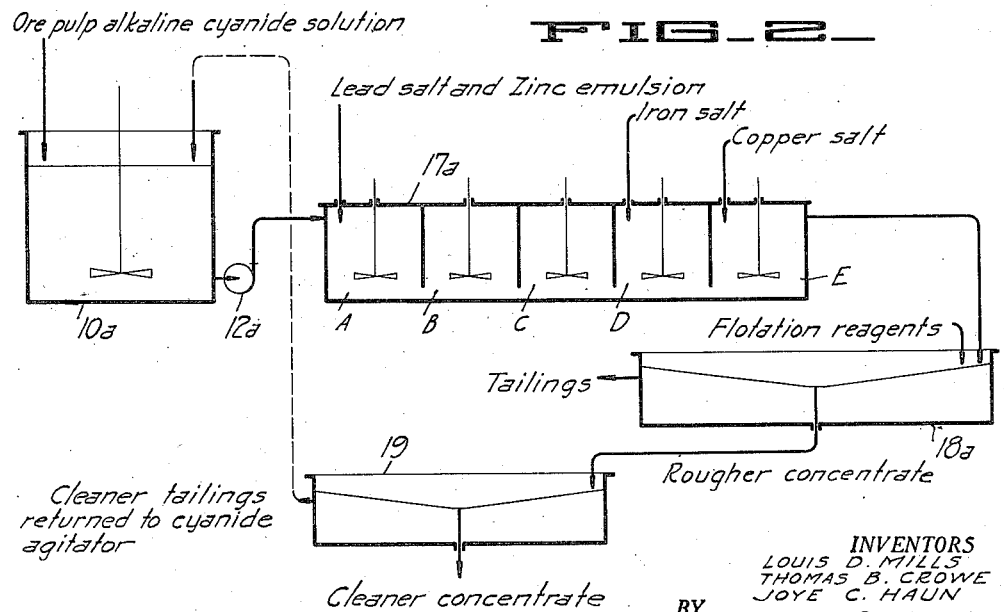

2,111,600

UNITED STATES PATENT OFFICE 2,111,600

PROCESS FOR RECOVERY OF PRECIOUS METALS

Louis D. Mills and Thomas B. Crowe, Palo Alto, and Joye C. Haun, San Francisco, Calif., assignors to The Merrill Company, San Francisco, Calif., a corporation of California Application June 2, 1936, Serial No. 83,080

17 Claims. (Cl. 75—2)

This invention relates generally to metallurgical processes used for the recovery of precious metal values from ores. As disclosed herein the process utilizes both cyanidation and flotation concentration operations.

Applicants have previously devised a process making use of both cyanidation and flotation concentration operations, for the efficient recovery of precious metal values from ores. The process in that instance is characterized by the fact that precipitation is carried out in a pulp consisting of comminuted ore solids and cyanide solution, as distinguished from precipitating in a clarified solution, as in conventional cyanidation systems. The process also carries out precipitation while the solution of the pulp is substantially neutral, and while it contains an acid reducing salt like sodium or calcium bisulphite, which serves to activate the zinc precipitant and at the same time provides a reducing agent to combine with and nullify the effect of oxygen present in the pulp. Such a process is particularly applicable to the treatment of gold ores where a cyanide solution can be employed, which after dissolving precious metal values from the ore, does not contain sufficient cyanide in such condition as to properly activate zinc or a like metallic precipitant, for efficient precipitation.

In many cyanidation system, the alkaline solution employed may contain sufficient cyanide to properly activate a precipitant like zinc dust, for efficient precipitation of the desired metal. The term "alkaline solution" is here used to designate solutions or pulps which are alkaline to phenol phthaline indicator, e. g. about pH 8.4. When such conditions exist, it has been found that precipitation in a combined cyanidation-flotation process such as described above, may not require neutralization of alkalinity, together with the presence of an activator, like an alkali bisulphite, for the precipitant. Furthermore, silver bearing ores, particularly if oxidized or partly oxidized, frequently contain appreciable amounts of manganese dioxide, which is a strong oxidizing agent and which rapidly attacks and destroys salts like the alkali bisulphites. Thus in a process in which such oxidizing agents are present in a pulp, it may be impractical to rely upon alkali bisulphite to condition the pulp for efficient precipitation, because oxidation by manganese dioxide and like agents in the pulp, would necessitate the use of relatively large and wasteful amounts of chemical.

In addition to the above, precious metal ores frequently contain substantial amounts of calcium carbonate or other acid consuming substances. If the solution of the pulp is to be neutralized prior to precipitation, the presence of such substances in the pulp necessitates a material increase in the amounts of reagents required.

In general it is an object of the present invention to provide a combined cyanidation-flotation process for the economical recovery of precious metal values from ores, without neutralizing the solution of the pulp before precipitation.

A further object of the invention is to provide a process involving precipitation of values in a pulp consisting of ore solids and cyanide solution, which will enable economical treatment of ores containing substantial amounts of strong oxidizing agents, like manganese dioxide, and/or acid consuming agents, like alkali carbonate.

Another object of the invention is to provide adequate treatment for preventing resolution of values precipitated in an ore pulp, during a subsequent flotation operation.

Briefly, the present process consists in contacting the comminuted ore or tailings with alkaline cyanide solution to dissolve the readily soluble metals. Following this dissolution treatment, the pulp, that is, the mixture of finely divided ore and solution, is conditioned for precipitation by removing or inhibiting free oxygen which may be present. This may be effected by the introduction of a reducing agent such as an alkali hydrosulphite, which will exist in an alkaline cyanide solution, and which will combine with dissolved oxygen. Since oxygen entrained in the pulp tends to go into solution, it is likewise nullified by such treatment. Alternatively, a major portion of the free oxygen may be removed by mechanical deaeration, after which the remainder is combined with the chemical reducing agent as above described. The alkali hydrosulphite serves not only to remove or inhibit dissolved oxygen but may also serve as a partial precipitant of the precious metals. The oxygen free alkaline pulp is then completely precipitated by the introduction of a suitable precipitant, such as zinc dust. To accelerate and render the precipitation more complete, a soluble lead salt, such as lead nitrate may be added to the pulp either prior to or simultaneously with the introduction of the zinc precipitant. Both the chemical deoxidation and the precipitation are accompanied by vigorous mechanical agitation under conditions which preclude re-absorption of atmosphere oxygen.

After precipitation is complete, the pulp is conditioned for flotation by converting cyanogen solvents present into compounds which are non-solvents for the precipitated metals. This can be accomplished by the addition of a suitable salt of a heavy metal, such as copper sulphate. The amount of copper sulphate added is in excess of that required to combine with cyanogen solvents present. The stabilized pulp is then subjected to flotation for the recovery of the precipitated metals and any additional precious metal bearing minerals which may be present. Conventional flotation reagents may be employed, as for instance suitable amounts of potassium amyl xanthate, cresylic acid, and pine oil.

A representative embodiment of the present process is shown in Fig. 1 of the accompanying drawing. As indicated at 10, pulverized ore containing the precious metals to be recovered, is intermixed with alkaline cyanide solution and subjected to agitation. During the course of this treatment, the precious metal values which are readily soluble, are extracted by the solution. The pulp is then elevated by pump 12 to a closed receiver 11, the cylindrical portion of which is filled with suitable grids over which the pulp flows in thin films while subjected to a high vacuum created by the vacuum pump 13. This treatment removes from the pulp substantially all of the mechanically entrained air and also that dissolved in the solution of the pulp. Deaerated pulp leaves the receiver through main discharge pipe 14, any excess being returned through overflow pipe 15 to agitator 10, the amount returned being controlled by regulation of pump 12. Receiver 11 is provided with a steeply sloping conical bottom 16, to prevent accumulation of solids. Overflow pipe 15 extends below the pulp level in agitator 10, and receiver 11 is located at sufficient height above the surface of the pulp in agitator 10, to provide a barometric seal, preventing ingress of air through overflow pipe 15, and allowing pulp to overflow freely from receiver 11 into agitator 10. This arrangement automatically seals the outlet of receiver 11, and obviates the use of an interior float to ensure a constant pulp level within the receiver, which is necesary to prevent air from leaving the receiver through main discharge pipe 14.

Mechanical deaeration equipment has heretofore been widely used in conventional cyanidation systems, to remove dissolved oxygen from clarified solutions. An ore pulp may be similarly deaerated, provided reasonable care is exercised in maintaining movement of the pulp through the evacuated deaerating receiver, to avoid clogging. A pulp of this character contains both entrained air particles and air dissolved in the solution, the amount of entrained air tending to increase with an increase in viscosity or increase in the percentage of slime particles, such as amorphous or clay material. All of the free oxygen present, including both that contained in the mechanically entrained air and that dissolved in the solution, may be destroyed or its oxidizing effect inhibited, by contactng the pulp with a chemical reducing agent such as alkali hydrosulphite. However where a considerable amount of total oxygen in the pulp requires the use of relatively large amounts of reducing agent to effect its nullification, we find it advantageous to first subject the pulp to mechanical deaeration, by which substantially all of the entrained air and from 85 to 90% of the oxygen dissolved in the solution, are removed. The remaining free oxygen can then be completely removed or nullified by the introduction of a chemical deoxidizing agent, after which the dissolved precious metals can be rapidly and effectively precipitated.

Thus following the mechanical deaeration operation in receiver 11, the pulp is shown being subjected to agitation in the first compartment A of a closed series agitator 17. In compartment A the pulp is intermixed with a suitable lead salt, such as lead acetate or lead nitrate. Since the solution of the pulp is alkaline, the lead salt is immediately converted to lead plumbite, which is dispersed in the pulp, to be subsequently deposited uniformly on the finely divided zinc, where it stimulates precipitation of the precious metals. Chemical deoxidation of the pulp is indicated in compartment B of agitator 17. To effect chemical deoxidation for the removal of dissolved oxygen, we make use of an active chemical deoxidizing agent, which is capable of existing in the presence of alkalinity, such as a metal hydrosulphite like zinc hydrosulphite, or an alkali hydrosulphite like sodium or calcium hydrosulphite, which is shown being introduced into compartment B of agitator 17 in controlled amounts.

Zinc dust precipitant, in the form of an emulsion of zinc dust in water, is introduced into compartment C, which in common with the other compartments is closed to the atmosphere and fitted with a mechanical agitator. Precipitation of the dissolved precious metals is effected in compartment C and next succeeding compartment D. Instead of introducing the alkali hydrosulphite and zinc emulsion separately, both may be added simultaneously, as for example to compartment B. Also, the alkali hydrosulphite may be formed continuously as required by adding a suitable amount of alkali bisulphite to the zinc dust emulsifier, the reaction between the zinc dust and the alkali bisulphite forming a hydrosulphite. The reaction mixture, upon being introduced into the alkaline pulp, causes complete elimination of free oxygen and precipitation of the metals. In typical instances the chemical deoxidation and precipitation will be complete in from 5 to 15 minutes. We have described the deoxidation and precipitation as being conducted in closed agitators, to effect economy in reagents. The operation may be practiced in open top agitators provided sufficient reducing agent is present and the surface of the pulp within the agitator fairly quiescent.

After the dissolved precious metals have been precipitated, the pulp is subjected to a stabilizing operation for the purpose of inhibiting cyanogen solvents for precious metals, which would otherwise partially redissolve the precipitated metals in the subsequent flotation operation. This stabilizing or inhibition of the cyanogen solvents can be satisfactorily carried out by addition of a suitable copper salt, like copper sulphate. Because copper salts are more expensive than iron salts it may be more economical in certain instances to inhibit most of the cyanogen solvents with a suitable iron salt, and then to complete the stabilization by the addition of a suitable copper salt like copper sulphate. Thus the stabilizing operation has been indicated in two stages in compartments E and F. In the first, or preliminary stabilizing stage E, a suitable iron salt such as ferrous sulphate or ferrous hydrate, is introduced into the pulp in an amount slightly greater than that theoretically required to combine with the cyanogen compounds known to be present. The ferrous sulphate immediately combines with the cyanogen compounds which are chiefly free cyanide and zinc cyanide, to form ferrous iron cyanide compounds. In the second or final stage of stabilizing F, a suitable copper salt such as copper sulphate is introduced into the pulp to complete the inhibition of the cyanogen solvents present.

Following stabilizing, the pulp is subjected to a flotation operation 18, for the recovery of a flotation concentrate containing the desired precious metal values.

In many instances the precious metal values of the flotation concentrate will consist mainly of those precious metals which were dissolved by the cyanide solution and subsequently precipitated. In other instances where the precious metals or precious metal minerals of the ore are not amenable to ready extraction by the cyanide solution, the flotation concentrate will consist in part of precipitated values, and in part of precious metals or precious metal minerals which were not dissolved by the cyanide solution.

The procedure described above, in which the zinc dust precipitant is first reacted with alkali bisulphite, is a convenient procedure for the formation of a hydrosulphite, and is also desirable in that this preliminary reaction tends to brighten the zinc particles, thus rendering them more active precipitants. However, as previously described, hydrosulphite can be supplied from some other source, and introduced into the pulp while the pulp is being agitated to effect chemical deoxidation, after which zinc dust can be suitably introduced into the pulp as a separate operation.

With respect to the introduction of a lead salt for coating the zinc particles with metallic lead, it is obvious that the point at which this lead is introduced into the pulp may be modified to suit various requirements, and, if desired, the lead salt and the zinc precipitant may be contacted and the zinc particles thus coated with metallic lead before the zinc is introduced into the pulp.

The stabilizing operation is a necessary feature of the complete process, because if cyanogen solvents for precious metals were not inhibited at this point, a portion of the precipitated precious metals, particularly gold, would be redissolved in the subsequent violent aeration of the flotation operation 18. However, when cyanogen solvents are properly inhibited, the flotation operation can be carried out by the use of standard flotation apparatus, with known flotation reagents such as xanthates, cresylic acid and pine oil, without appreciable re-solution of the precipitated metals.

Use of copper sulphate as described has been found beneficial to flotation, particularly where xanthates are employed as flotation reagents. This is because metallic copper precipitates on the zinc precipitant along with the precious metals, and enters into reaction with xanthate to form copper xanthate, which greatly facilitates flotation of the precious metal values.

In order to secure proper precipitation of dissolved precious metals, the process as disclosed requires the presence of sufficient cyanide in the solution to properly activate the metallic precipitant. Therefore, the process is particularly adapted for use on ores of which the precious metal values are predominantly silver, although some gold may also be present. Relatively strong cyanide solutions are required for the dissolution of silver minerals and therefore in treating such ores the solution will initially contain sufficient free cyanide to properly dissolve both the gold and the silver, and after dissolution the solution will still contain sufficient cyanide so that the precipitation of the dissolved metals can be economically and efficiently carried out in an alkaline circuit, that is, where the solution of the pulp is distinctly alkaline to phenol phthalein. For each unit of silver precipitated by the zinc, a corresponding amount of alkali zinc cyanide is formed. Since the solution is alkaline, some of the zinc cyanide, in accordance with well known reactions, is immediately converted to free alkali cyanide and alkali zincate, thus increasing the cyanide strength and consequently the precipitation activity of the solution as deposition of the silver continues.

Where the ore being treated contains oxidizing agents like manganese dioxide, there is no appreciable increase in the consumption of hydrosulphite or like deoxidizing chemical, because such agents are relatively inert in an alkaline solution, and will not react with the hydrosulphite. Since conditioning of the pulp for precipitation does not involve a neutralizing operation, the presence of calcium carbonates or like acid consuming substances can cause no difficulty, particularly if the solution of the pulp remains alkaline throughout the process.

The term "ore" as used herein has reference in general to gold and silver bearing deposits. Thus the process in certain instances can be applied to tailings from previous metallurgical operations, as well as to natural ore deposits which have not been previously treated. Also the process may be combined with conventional cyanidation, as for instance in the following manner. After crushing and grinding, the ore pulp may be classified into sand and slime, that is, into coarser and finer portions. The sand then may be very economically leached with cyanide solution in open tanks for high recoveries of gold and silver. The slime may be treated by the process of the present invention. The equipment required is much simpler and much cheaper than that heretofore used in the conventional cyanidation of slime, and the recoveries of silver and gold will in many cases, be higher than heretofore obtained, owing to the fact that the process recovers not only soluble values but also additional values occluded in mineral particles.

In the cyanidation treatment of some ores, particularly where the predominant precious metal is silver, the alkaline pulp, after dissolution of the metals, may contain only relatively small amounts of residual free oxygen. In such cases, mechanical and/or chemical deoxidation of the pulp with a chemical deoxidizing agent such as alkali hydrosulphite, may be dispensed with, the small amount of free oxygen remaining in the pulp being nullified by the reducing action of the precipitant itself, provided the amount of precipitant employed is sufficient to precipitate the desired metal, in addition to serving as a reducing agent.

Such a modified treatment is shown in outline drawing Fig. 2. The ore pulp, after dissolution of the readily soluble precious metals in agitator 10a, is transferred by pump 12a to the first compartment of the series mechanical agitator 17a, which is preferably closed to the atmosphere. To the pulp in compartment A, is added a precipitant such as zinc dust emulsion, together with a soluble lead salt such as lead nitrate. Precipitation of the precious metals takes place in compartments A, B and C, through which the pulp passes in series.

Stabilizing of the pulp, that is, inhibition of the cyanogen solvents for the precipitated precious metals can be carried out entirely by the use of a copper salt, or in the manner previously described with reference to Fig. 1, by the addition of a soluble iron salt, such as ferrous sulphate, to compartment D, and of a soluble copper salt, such as copper sulphate, to compartment E, following which the pulp flows to a conventional flotation machine 18a. Flotation reagents are added and the pulp subjected to flotation concentration, yielding a rougher flotation concentrate and a tailing which is discharged to waste.

The rougher concentrate may be subjected to further cyanidation for the recovery of the contained precious metals, or it may be first cleaned or enriched in precious metals by refloating. For this purpose the rougher concentrate may pass to a second flotation machine 19, with or without the further addition of flotation reagents. The enriched cleaner concentrate passes to further treatment by conventional methods for final recovery of the precious metals, and the cleaner tailings can be returned to cyanide agitator 10a, where they are subjected to further extraction by cyanidation and then to re-precipitation and reflotation. Precious metal values contained in the cleaner tailings or middlings, as they are called, are frequently only slowly soluble in cyanide solution, and the above described step of returning the cleaner tailings to further cyanidation treatment, is a new and useful method of obtaining higher recoveries of the precious metals from many ores, and at the same time producing a high grade, cleaner concentrate for subsequent treatment or shipment to a smelter, which may be desirable on some ores. The majority of the copper or copper compounds resulting from the introduction of copper sulphate, pass out with the cleaner concentrate, and are therefore not returned to the process. Return of substantial amounts of copper to the agitator tank 10a would be objectionable, because it would cause formation of copper cyanides, thus requiring additional cyanide to properly dissolve the precious metal values and to activate precipitation.

This application is a continuation in part of subject matter disclosed and claimed in our co-pending application Serial No. 41,768, filed September 23, 1935.

We claim:

1. In a process of the character described for the recovery of precious metal values from ores, forming a pulp consisting of comminuted ore solids and alkaline cyanide solution containing precious metals dissolved from the ore, subjecting the pulp to mechanical deaeration, subjecting the mechanically deaerated pulp to chemical deoxidation, precipitating dissolved precious metals in the pulp, stabilizing the pulp by inhibiting cyanogen solvents for the precious metals, and then subjecting the pulp to a flotation operation for the recovery of a flotation concentrate containing the desired precious metal values.

2. In a process of the character described for the recovery of precious metals from ores, forming a pulp consisting of comminuted ore solids and alkaline cyanide solution containing precious metals dissolved from the ores, subjecting the pulp to mechanical deaeration, introducing an alkali hydrosulphite into the pulp whereby the remaining free oxygen is removed, precipitating dissolved precious metals in the pulp, stabilizing the pulp by inhibiting cyanogen solvents for precious metals, and then subjecting the pulp to a treatment for the removal of a concentrate containing the desired precious metal values.

3. In a process of the character described for the recovery of precious metal values from ores, forming a pulp consisting of comminuted ore solids and alkaline cyanide solution containing precious metals dissolved from the ore, precipitating dissolved precious metals in the pulp, introducing iron salt into the precipitating pulp to combine with cyanogen solvents for precious metals, introducing a copper salt into the precipitated pulp to combine with residual cyanogen solvents for precious metals, and then subjecting the pulp to a flotation operation for the recovery of a flotation concentrate containing the desired precious metal values.

4. In a cyanide process for the recovery of precious metal values from ores, forming a pulp consisting of comminuted ore solids and alkaline cyanide solution containing precious metals dissolved from the ore, removing free oxygen from the pulp, precipitating dissolved precious metals in the alkaline pulp, stabilizing the pulp by inhibiting cyanogen solvents for the precious metals, said stabilizing operation including first introducing an iron salt into the pulp following by introduction of a copper salt, and then subjecting the pulp to a flotation operation for the recovery of the flotation concentrate containing the desired precious metal values.

5. In a process of the character described for the recovery of precious metal values from ores containing oxidizing agents like manganese dioxide, forming a pulp consisting of comminuted ore solids and alkaline cyanide solution, and removing free oxygen from the pulp by introduction of a hydrosulphite, while alkalinity of the pulp is maintained to inhibit oxidation of the hydrosulphite by the manganese dioxide of the ore.

6. In a process of the character described for the recovery of precious metal values from ores forming a pulp consisting of comminuted ore solids and alkaline cyanide solution, containing precious metals dissolved from the ore, precipitating the dissolved precious metals in the pulp, adding a copper salt to the pulp, subjecting the pulp to a flotation operation, and returning at least a part of the flotation tailings for recyanidation and flotation with solids of the ore.

7. In a process of the character described, forming a pulp consisting of finely divided ore solids, cyanide solution, and precipitated precious metal values, subjecting the pulp to a flotation operation by the use of xanthate as a flotation agent, and introducing copper sulphate into the pulp prior to the flotation operation to prevent resolution of precipitated precious metal values and to aid in effecting efficient flotation.

8. In a process of the character described for the recovery of precious metal values from ores, forming a pulp consisting of comminuted ore solids and alkaline cyanide solution containing precious metals dissolved from the ore, precipitating the dissolved precious metal values in the alkaline pulp, adding to the pulp a salt capable of combining with cyanogen solvents of precious metals to form cyanogen compounds in which precious metals are substantially insoluble, and then subjecting the pulp to a flotation operation for the recovery of a flotation concentrate containing the desired precious metal values, the flotation operation being characterized by aeration of the pulp.

9. In a process of the character described for the recovery of precious metal values from ore, forming a pulp consisting of comminuted ore solids and alkaline cyanide solution containing precious metals dissolved from the ore, precipitating the dissolved precious metals in the alkaline pulp, adding copper sulphate to the alkaline pulp in an amount in excess of that required to combine with cyanogen solvents of precious metal, thereby stabilizing the pulp, and then subjecting the pulp to a flotation operation for the recovery of a flotation concentrate containing the desired precious metal values, said flotation operation being characterized by aeration of the pulp.

10. In a process of the character described for the recovery of precious metal values from ores containing oxidizing agents like manganese dioxide, forming a pulp consisting of comminuted ore solids and alkaline cyanide solution, and removing free oxygen from the pulp by the use of a sulphite salt, while alkalinity of the pulp is maintained to inhibit oxidation of the sulphite salt by the manganese dioxide of the ore.

11. In a process for the recovery of precious metal values from a pulp consisting of comminuted ore solids and cyanide solution containing precious metals dissolved from the ore, effecting precipitation of dissolved precious metals in the pulp, stabilizing the pulp by destroying cyanogen solvents for precious metals, and then subjecting the pulp to a flotation operation for the removal of a flotation concentrate containing the desired precious metal values.

12. In a process for the recovery of precious metal values from pulp consisting of comminuted ore solids and cyanide solution containing precious metals dissolved from the ore, effecting precipitation of dissolved precious metals in the pulp, while the solution of the pulp contains a deoxidizing agent, thereafter stabilizing the solution by destroying cyanogen solvents for the precipitated metals, and then subjecting the pulp to a flotation operation for the removal of a flotation concentrate containing the precious metal values from the ore.

13. In a process for the recovery of precious metal values from a pulp consisting of comminuted ore solids and cyanide solution containing precious metals dissolved from the ore, effecting precipitation of dissolved metals in the pulp, introducing into the pulp a metallic salt capable of combining with cyanogen solvents for precious metals to form cyanogen compounds in which precipitated precious metals are substantially insoluble, and then subjecting the pulp to a flotation operation for the removal of a flotation concentrate containing the desired precious metal values.

14. In a process for the recovery of precious metal values from a pulp consisting of comminuted ore solids and cyanide solution containing dissolved precious metals, precipitating the dissolved precious metals in the pulp while the pulp contains a sulphite salt, stabilizing the pulp by inhibiting cyanogen solvents for precious metals, and then subjecting the pulp to a flotation operation for the removal of a flotation concentrate containing the desired precious metal values.

15. In a process for the recovery of precious metal values from a pulp consisting of comminuted ore solids and cyanide solution containing dissolved precious metals, effecting precipitation of the dissolved precious metals in the pulp, stabilizing the pulp by reacting the same with copper sulphate, and then subjecting the pulp to a flotation operation for the removal of a flotation concentrate containing the desired precious metal values.

16. In a process for the recovery of precious metal values from a pulp consisting of comminuted ore solids and cyanide solution containing precious metals dissolved from the ore, effecting precipitation of the dissolved metals in the pulp, by the use of zinc dust as a metallic precipitant, introducing into the pulp metallic salt capable of combining with cyanogen solvents for precious metals to form cyanogen compounds in which precipitated precious metals are substantially insoluble, and then subjecting the pulp to a flotation operation for the removal of a flotation concentrate containing the desired precious metal values.

17. In a process for the recovery of precious metal values from a pulp consisting of comminuted ore solids and cyanide solution containing precious metals dissolved from the ore, effecting precipitation of dissolved metals in the pulp, introducing into the pulp a chemical capable of combining with cyanogen solvents for precious metals to form cyanogen compounds in which precipitated precious metals are substantially insoluble, and then subjecting the pulp to a flotation operation for the removal of a flotation concentrate containing the desired precious values.

LOUIS D. MILLS.
THOMAS B. CROWE.
JOYE C. HAUN.